United States Patent
Lefevre et al.

(10) Patent No.: US 12,371,566 B2
(45) Date of Patent: Jul. 29, 2025

(54) HOT-WATER MOLDABLE POLYAMIDE MOLDING COMPOSITIONS

(71) Applicant: SOLVAY SPECIALTY POLYMERS USA, LLC, Alpharetta, GA (US)

(72) Inventors: Pascal Lefevre, Lebbeke (BE); Glenn P. Desio, Marietta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 932 days.

(21) Appl. No.: 17/609,015

(22) PCT Filed: May 7, 2020

(86) PCT No.: PCT/EP2020/062693
§ 371 (c)(1),
(2) Date: Nov. 5, 2021

(87) PCT Pub. No.: WO2020/225358
PCT Pub. Date: Nov. 12, 2020

(65) Prior Publication Data
US 2022/0213320 A1  Jul. 7, 2022

Related U.S. Application Data

(60) Provisional application No. 62/844,850, filed on May 8, 2019.

(30) Foreign Application Priority Data

Sep. 23, 2019 (EP) .................................. 19198864

(51) Int. Cl.
*C08L 77/06* (2006.01)
(52) U.S. Cl.
CPC .................................. *C08L 77/06* (2013.01)
(58) Field of Classification Search
CPC ...................................................... C08L 77/06
See application file for complete search history.

(56) References Cited

U.S. PATENT DOCUMENTS

| | | | |
|---|---|---|---|
| 10,907,042 B2 * | 2/2021 | Okamoto | C08G 69/26 |
| 2013/0172460 A1 | 7/2013 | Mitadera et al. | |
| 2014/0342145 A1 | 11/2014 | Oguro et al. | |
| 2015/0322206 A1 | 11/2015 | Matsumoto et al. | |
| 2016/0122540 A1 | 5/2016 | Brule et al. | |
| 2016/0145419 A1 | 5/2016 | Takano et al. | |
| 2019/0077957 A1 | 3/2019 | Yamada et al. | |

FOREIGN PATENT DOCUMENTS

| JP | 2010070637 A | * | 4/2010 | |
|---|---|---|---|---|
| WO | WO-2017110372 A1 | * | 6/2017 | ............. B29C 65/16 |

OTHER PUBLICATIONS

Murphy J., in "Additives for Plastics Handbook", 2nd Edition, 2001, Chapter 5.2.3., p. 43-48—Elsevier Advanced Technology.
Standard ISO 527-1966, "Plastics—Determination of Tensile Properties", 1966, p. 1-12.
Standard ISO 2813-2014, "Paints and varnishes—Determination of gloss value at 20°, 60° and 85°", Oct. 1, 2014, p. 1-23.
Standard ISO 180-2000, "Plastics—Determination of Izod impact strength", 2000, p. 1-18.
Standard ISO 1997-2018, "Granulated cork and cork powder—Classification, properties and packing", Oct. 2018, p. 1-10.
Standard ASTM D3418-03, "Standard Test Method for Transition Temperatures and Enthalpies of Fusion and Crystallization of Polymers by Differential Scanning Calorimetry", 2003, p. 1-7.

* cited by examiner

*Primary Examiner* — Vickey Nerangis
(74) *Attorney, Agent, or Firm* — Osha Bergman Watanabe & Burton LLP

(57) ABSTRACT

A polyamide molding composition (C) is provided and comprises at least one polyamide (P1) comprising recurring units ($R_{P A}$) according to formula (I):

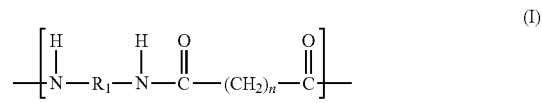

Wherein n varies between 4 and 18, inclusive, and $R_1$ is a mixture of m-xylylene (MX) and p-xylylene (PX) in a mol.% ratio varying between 1:99 and 99:1. The polyamide molding composition (C) further comprises at least one polymer (P2). The weight ratio of P1/P2 varies between 15/1 and 1/1 and polymer (P2) comprises recurring units ($R_{P A 2}$) according to formula (V):

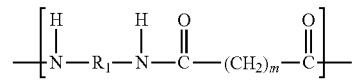

Wherein m varies between 6 and 18 and $R_1$ is p-xylylene (PX). The polyamide molding compositing (C) optionally comprises at least one reinforcing agent, and/or at least one component selected from the group consisting of tougheners, plasticizers, colorants, pigments, antistatic agents, dyes, lubricants, thermal stabilizers, light stabilizers, flame retardants, nucleating agents and antioxidants.

12 Claims, No Drawings

HOT-WATER MOLDABLE POLYAMIDE MOLDING COMPOSITIONS

CROSS REFERENCE TO RELATED APPLICATIONS

This application is a U.S. National Stage entry under 35 U.S.C. 371 of International Application No. PCT/EP2020/062693, filed on May 7, 2020, which claims priority to U.S. provisional patent application No. 62/844,850, filed on May 8, 2019, and European patent application No. 19198864.1, filed on Sep. 23, 2019, the entire contents of each hereby being incorporated herein by reference for all purposes.

FIELD

The present invention relates to a polyamide molding composition (C), and particularly to a polyamide molding composition (C) that is injection moldable under low mold temperature conditions.

BACKGROUND

Thermoplastic polyamide-based compositions are raw materials that can be transformed by injection molding. Due to their excellent mechanical strength, heat resistance, water resistance and chemical resistance, fiber-reinforced plastics produced from thermoplastic polyamide-based compositions are used in a number of diverse applications, such as automotive, transportation, electrical and electronics. Typical applications include control system enclosures, housings for water pumps, thermostats and electronic valve pumps, oil coolers, water pump impellers, heater core end caps, snap-fit electrical terminals and molded-in-place gaskets, connectors and switches.

Most of the commercially available polyamides recommended for these markets have a glass transition temperature (Tg) around 100° C. or higher. For such products to be injection molded with sufficient quality, the mold has to be heated to around 120° C. in order to ensure full crystallinity of the polymer notably at the centre of the mold cavity. Molding at lower temperature will not allow to have full crystallinity of the polyamide and by consequence the expected mechanical performances as well as an acceptable surface appearance.

There is a need for polyamides which can be molded at lower temperatures, while still maintaining their properties, that-is-to-say mechanical strength, heat resistance, water resistance and chemical resistance.

The Applicant has identified polyamide molding compositions which can be injection molded at low temperatures and pressures in less expensive equipment. These compositions produce molded articles having surface characteristics and mechanical properties similar to articles molded with conventional high temperature high pressure techniques. The compositions of the present invention significantly reduce the cycle time required to mold an article.

SUMMARY

The present invention relates to a polyamide molding composition (C), comprising:
at least one polyamide (P1) comprising recurring units ($R_{PA}$) according to formula (I):

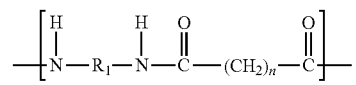

Wherein
n varies between 4 and 18, inclusive, preferably 4, and
$R_1$ is a mixture of m-xylylene (MX) and p-xylylene (PX) in a mol. % ratio varying between 1:99 and 99:1,
at least one polymer (P2) such that:

$Tm(P2) \geq Tm(P1)$, with Tm(P2) and Tm(P1) being respectively the melting point of P2 and P1, $Tc(P2) > Tc(P1)$, with Tc(P2) and Tc(P1) being respectively the crystallization temperature of P2 and P1 upon cooling from the melt, and $Tm(P2)-Tc(P2) < Tm(P1)-Tc(P1)$ wherein the weight ratio of P1/P2 varies between 15/1 and 1/1
optionally at least one reinforcing agent,
optionally at least one component selected from the group consisting of tougheners, plasticizers, colorants, pigments, antistatic agents, dyes, lubricants, thermal stabilizers, light stabilizers, flame retardants, nucleating agents and antioxidants.

The present invention also relates to a process to manufacture an article using molding, comprising the steps of:
heating a polyamide molding composition (C)
heating a mold to a temperature of less than 110° C., preferably less than 100° C. or 95° C.,
injecting the melted composition (C) into the heated mold, and
releasing the molded article.
Preferably, according to the present invention, water is used to heat the mold.

The present invention also relates to a molded article obtained by this process, having a calculated percentage of crystallinity higher than 90%, preferably higher than 95%, as measured according to the following equation:

$$\% \text{ of crystallinity} = \frac{\Delta Hf - \Delta Hc}{\Delta Hf} \times 100$$

wherein:
$\Delta Hf$ is the enthalpy of fusion at 1st heating (J/g),
$\Delta Hc$ is the crystallization enthalpy at 1st heating (J/g),
as measured by DSC according to ASTM D3418 (TA Instruments D2920 with nitrogen as carrier gas of high purity, 50 ml/min).

Advantageously, the article also presents at least one of the following properties:
an impact strength of at least 40 kJ/m², as measured according to ISO 180/1U, at least 42 kJ/m², a modulus of at least 18 GPa, as measured according to ISO0527, preferably 19 GPa, a gloss of at least 1.5 at 20°, at least 8 at 60° and at least 12 at 85° as measured according to ISO02813, when molded at 90° C., a gloss of at least 3 at 20°, at least 15 at 60° and at least 20 at 85° as measured according to ISO02813, when molded at 100° C., a surface rugosity of less than 1.5 μm as measured according to ISO 4287:1997, when molded at 90° C., a surface rugosity of less than 1 μm as measured according to ISO 4287:1997, when molded at 100° C.

DETAILED DESCRIPTION

Described herein are polyamide molding compositions (C), comprising at least one polyamide (P1), for example derived a mixture of m-xylylene diamine (MXD) and p-xylylene diamine (PXD), and at least one dicarboxylic acid HOOC—$(CH_2)_n$—COOH, wherein n varies between 4 and 18, inclusive, as well as at least one polymer (P2) presenting a specific set of thermal properties. Also described herein is a process to manufacture an article by injection molding, including the step of heating the polyamide molding compositions (C).

The polyamide molding compositions (C) described herein present the main advantage of being hot-water moldable, which means that they are moldable at a temperature below 110° C., for example at 100° C. or at 90° C. The use of such compositions to manufacture articles by injection molding not only allows to significantly reduce the cycle time required to mold an article, but they also require less expensive, easily accessible, materials. Furthermore, hot water can be used to heat the mold.

According to an embodiment, the polyamide molding composition (C) of the present invention allows to obtain articles presenting a calculated percentage of crystallinity higher than 90%, preferably higher than 95% when molded at temperature less than 110° C., preferably less than 100° C., as measured according to the following equation:

$$\% \text{ of crystallinity} = \frac{\Delta Hf - \Delta Hc}{\Delta Hf} \times 100$$

wherein:

$\Delta Hf$ is the enthalpy of fusion at 1st heating (J/g), $\Delta Hc$ is the crystallization enthalpy at 1st heating (J/g), as measured by DSC according to ASTM D3418 (TA Instruments D2920 with nitrogen as carrier gas of high purity, 50 ml/min).

The polyamide molding compositions (C) described herein also have good mechanical performances (e.g. tensile modulus, tensile strength at break, impact resistance).

The polyamide molding compositions (C) described herein are based on the combination of at least two polymers, more precisely at least one polyamide (P1) and at least one polymer (P2) in a specific weight ratio. The compositions of the invention advantageously also comprise at least one reinforcing agent.

The polyamide (P1) described herein comprises recurring units ($R_{PA}$, or "recurring unit x") of formula (I):

wherein n varies between 4 and 18, inclusive, preferably n equals 4, and $R_1$ is a mixture of m-xylylene (MX) and p-xylylene (PX) in a mol. % ratio varying between 1:99 and 99:1.

The polyamide (P1) described herein may be a polyamide consisting essentially in recurring units ($R_{PA}$) or a copolyamide (PA) comprising recurring units ($R_{PA}$). More precisely, the expression "copolyamide" is hereby used for designating copolyamides comprising recurring units ($R_{PA}$), for example derived from MXD and PXD, and at least one dicarboxylic acid HOOC—$(CH_2)_n$—COOH, wherein n varies between 4 and 18, inclusive, as well as recurring units ($R_{PA}*$), e.g., recurring units ($R_{PAY}$) and ($R_{PAZ}$), distinct from recurring units ($R_{PA}$).

According to an embodiment, the polyamide (P1) consists essentially in recurring units ($R_{PA}$) of formula (I), for example derived from m-xylylene diamine (MXD) and p-xylylene diamine (PXD), in a mol. % ratio varying between 1:99 and 99:1, and adipic acid.

The polyamide (P1) described herein is the condensation product of a mixture comprising:

at least one diamine component which is mixture of m-xylylene diamine and p-xylylene diamine, in a mol. % varying between 1:99 and 99:1, inclusive, and at least one diacid component which is a dicarboxylic acid HOOC—$(CH_2)_n$—COOH, wherein n varies between 4 and 18, inclusive, or derivatives thereof.

In some embodiments, the diamine component is mixture of m-xylylene diamine and p-xylylene diamine, in a mol. % varying between 10:90 and 90:10, inclusive, or varying between 20:80 and 80:20, inclusive. The mol. % m-xylylene diamine and p-xylylene diamine can for example be 50:50 or 70:30 or 60:40.

In some embodiments, the diacid component is a dicarboxylic acid HOOC—$(CH_2)_n$—COOH, wherein n varies between 4 and 10, inclusive, or between 4 and 8. Preferably, the diacid component includes adipic acid.

When the polyamide (P1) comprises recurring units ($R_{PA}*$), the recurring units ($R_{PAY}$ and $R_{PAZ}$) may be of formula (II) and/or (III):

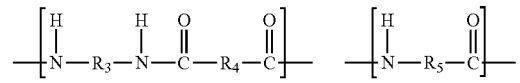

wherein $R_3$ is selected from the group consisting of a bond, a $C_1$-$C_{15}$ alkyl and a $C_6$-$C_{30}$ aryl, optionally comprising one or more heteroatoms (e.g. O, N or S) and optionally substituted with one or more substituents selected from the group consisting of halogen (e.g. fluorine, chlorine, bromine or iodine), hydroxy (—OH), sulfo (—$SO_3M$) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl;

$R_4$ is selected from the group consisting of a $C_1$-$C_{20}$ alkyl and a $C_6$-$C_{30}$ aryl, optionally comprising one or more heteroatoms (e.g. O, N or S) and optionally substituted with one or more substituents selected from the group consisting of halogen (e.g. fluorine, chlorine, bromine or iodine), hydroxy (—OH), sulfo (—$SO_3M$) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl; and $R_5$ is selected from the group consisting of a linear or branched $C_2$-$C_{14}$ alkyl, optionally comprising one or more heteroatoms (e.g. O, N and S) and optionally substituted with one or more substituents selected from the group consisting of halogen (e.g. fluorine, chlorine, bromine and iodine), hydroxy (—OH), sulfo (—SO$_3$M) (e.g. wherein M is H, Na, K, Li, Ag, Zn, Mg or Ca), $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

The polyamide (P1) described herein may be of formula (IV):

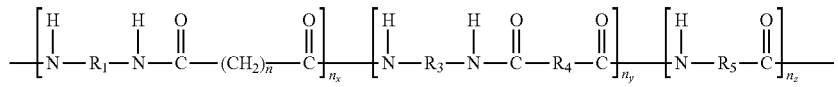

wherein $n_x$, $n_y$ and $n_z$ are respectively the moles % of each recurring units x according to Formula I, ($R_{PAY}$) according to formula (II) and ($R_{PAZ}$) according to formula (III);

recurring units x, ($R_{PAY}$) and ($R_{PAZ}$) are arranged in blocks, in alternation or randomly;

$n_x+n_y+n_z=100$;

$5 \leq n_x \leq 100$;

$R_1$, $R_3$, $R_4$ and $R_5$ being as described above.

The polyamides (P1) described herein may have a number average molecular weight Mn ranging from 1,000 g/mol to 40,000 g/mol, for example from 2,000 g/mol to 35,000 g/mol or from 4,000 to 30,000 g/mol. The number average molecular weight Mn can be determined by gel permeation chromatography (GPC) using ASTM D5296 with polystyrene standards.

In the polyamide (P1) described herein, the recurring unit ($R_{PAY}$) may be aliphatic or aromatic. For the purpose of the present invention, the expression "aromatic recurring unit" is intended to denote any recurring unit that comprises at least one aromatic group. The aromatic recurring units may be formed by the polycondensation of at least one aromatic dicarboxylic acid with an aliphatic diamine or by the polycondensation of at least one aliphatic dicarboxylic acid with an aromatic diamine, or by the polycondensation of aromatic aminocarboxylic acids. For the purpose of the present invention, a dicarboxylic acid or a diamine is considered as "aromatic" when it comprises one or more than one aromatic group.

In the polyamide (P1) described herein, the recurring unit ($R_{PAZ}$) is aliphatic and $R_5$ is a linear or branched $C_2$-$C_{14}$ alkyl, optionally comprising one or more heteroatoms (e.g. O, N and S) and optionally substituted with one or more substituents selected from the group consisting of halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy and $C_6$-$C_{15}$ aryl.

The polyamide (P1) described herein may be composed of recurring units x and ($R_{PAY}$), or of recurring units x and ($R_{PAZ}$), or of recurring units x, ($R_{PAY}$) and ($R_{PAZ}$). Recurring units x, ($R_{PAY}$) and ($R_{PAZ}$) are arranged in blocks, in alternation or randomly.

In the present application:

any description, even though described in relation to a specific embodiment, is applicable to and interchangeable with other embodiments of the present disclosure;

where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Throughout this document, all temperatures are given in degrees Celsius (° C.).

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and are called sometimes in this case "alkylaryl"; for example may be composed of a cycloaromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

According to an embodiment, the polyamide (P1) described herein is the condensation product of a mixture comprising:

at least one diamine component which comprises at least 5 mol. % of a mixture of MXD and PXD, in the mole percentage defined below, (or at least 10 mol. %, at least 15 mol. %, at least 20 mol. %, at least 25 mol. %, at least 30 mol. %, at least 35 mol. %, at least 40 mol. %, at least 45 mol. %, at least 50 mol. %, at least 55 mol. %, at least 60 mol. %, at least 65 mol. %, at least 70 mol. %, at least 75 mol. %, at least 80 mol. %, at least 85 mol. %, at least 90 mol. %, at least 95 mol. % or at least 98 mol. % of MXD and PXD), and at least one dicarboxylic acid component which comprises at least 5 mol. % of HOOC—$(CH_2)_n$—COOH, wherein n varies between 4 and 18, inclusive, or derivative thereof, (or at least 10 mol. %, at least 15 mol. %, at least 20 mol. %, at least 25 mol. %, at least 30 mol. %, at least 35 mol. %, at least 40 mol. %, at least 45 mol. %, at least 50 mol. %, at least 55 mol. %, at least 60 mol. %, at least 65 mol. %, at least 70 mol. %, at least 75 mol. %, at least 80 mol. %, at least 85 mol. %, at least 90 mol. %, at least 95 mol. % or at least 98 mol. % of HOOC—$(CH_2)_n$—COOH).

The polyamide (P1) described herein may be a polyamide consisting essentially in recurring units ($R_{PA}$). In such case, the polyamide comprises recurring units ($R_{PA}$) as well as less than 2 mol. % of recurring units distinct from recurring units ($R_{PA}$), for example less than 1 mol. %, less than 0.5 mol. % or even less than 0.1 mol. % of recurring units distinct from recurring units ($R_{PA}$).

The expression "at least" is hereby intended to denote "equals to or more than". For example, the expression "at least 5 mol. % of recurring units ($R_{PA}$)" hereby denotes that the polyamide (P1) may comprise 5 mol. % of recurring units ($R_{PA}$) or more than 5 mol. % of recurring units ($R_{PA}$). The expression "at least" therefore corresponds to the mathematical symbol "≥" in the context of the present invention.

The expression "less than" corresponds to the mathematical symbol "<" in the context of the present invention. For example, the expression "less than 100 mol. % of recurring units ($R_{PA}$)" hereby denotes that the polyamide comprises strictly less than 100 mol. % of recurring units ($R_{PA}$) and therefore qualify as a copolyamide, made from recurring units ($R_{PA}$) and at least one another recurring unit ($R_{PA}$*).

According to an embodiment, the polyamide (P1) described herein is the condensation product of a mixture further comprising at least one of the components selected from the group consisting of:
at least one dicarboxylic acid component (also called hereby diacid) or derivative thereof, and at least one diamine component,
at least one aminocarboxylic acid, and
at least one lactam.

According to this embodiment, the dicarboxylic acid component can be chosen among a large variety of aliphatic or aromatic components comprising at least two acidic moieties —COOH. According to this embodiment, the diamine component can be chosen among a large variety of aliphatic or aromatic components comprising at least two amine moieties —$NH_2$.

The expression "derivative thereof" when used in combination with the expression "dicarboxylic acid" is intended to denote whichever derivative which is susceptible of reacting in polycondensation conditions to yield an amide bond. Examples of amide-forming derivatives include a mono- or di-alkyl ester, such as a mono- or di-methyl, ethyl or propyl ester, of such carboxylic acid; a mono- or di-aryl ester thereof; a mono- or di-acid halide thereof; a carboxylic anhydride thereof and a mono-or di-acid amide thereof, a mono- or di-carboxylate salt.

Non limitative examples of aliphatic dicarboxylic acids are notably oxalic acid (HOOC—COOH), malonic acid (HOOC—$CH_2$—OOOH), succinic acid [HOOO—$(CH_2)_2$—OOOH], glutaric acid [HOOO—$(CH_2)_3$—OOOH], 2,2-dimethyl-glutaric acid [HOOC—$C(CH_3)_2$—$(CH_2)_2$—OOOH], adipic acid [HOOO—$(CH_2)_4$—OOOH], 2,4,4-trimethyl-adipic acid [HOOC—$CH(CH_3)$—$CH_2$—$C(CH_3)_2$—$CH_2$—OOOH], pimelic acid [HOOC—$(CH_2)_5$—COOH], suberic acid [HOOO—$(CH_2)_6$—OOOH], azelaic acid [HOOO—$(CH_2)_7$—OOOH], sebacic acid [HOOO—$(CH_2)_8$—OOOH], undecanedioic acid [HOOO—$(CH_2)_9$—OOOH], dodecandioic acid [HOOO—$(CH_2)_{10}$—OOOH], tridecanedioic acid [HOOO—$(CH_2)_{11}$—OOOH], tetradecanedioic acid [HOOO—$(CH_2)_{12}$—OOOH], pentadecanedioic acid [HOOO—$(CH_2)_{13}$—OOOH], hexadecanedioic acid [HOOO—$(CH_2)_{14}$—OOOH], octadecanedioic acid [HOOO—$(CH_2)_{16}$—OOOH]. Included in this category are also cycloaliphatic dicarboxylic acid such as 1,4-cyclohexane dicarboxylic acid and 1,3-cyclohexanedicarboxylic acid.

Non limitative examples of aromatic diacids are notably phthalic acids, including isophthalic acid (IPA), terephthalic acid (TPA), naphthalendicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl) hexafluoropropane, 2,2-bis(4-carboxyphenyl)ketone, 4,4'-bis(4-carboxyphenyl)sulfone, 2,2-bis(3-carboxyphenyl) propane, bis(3-carboxyphenyl)methane, 2,2-bis(3-carboxyphenyl)hexafluoropropane, 2,2-bis(3-carboxyphenyl)ketone, bis(3-carboxyphenoxy)benzene.

Non limitative examples of aromatic diamines ($NN_{ar}$) are notably 3,4'-diaminodiphenyl ether (3,4'-ODA) and 4,4'-diaminodiphenyl ether (4,4'-ODA).

Non limitative examples of aliphatic diamines ($NN_{al}$) are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine (or 1,6-diaminohexane), 3-methylhexamethylenediamine, 2,5-dimethylhexamethylenediamine, 2,2,4-trimethylhexamethylenediamine, 2,4,4-trimethylhexamethylenediamine, 1,7-diaminoheptane, 1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, 1,12 diaminododecane, 1,13 diaminotridecane, 2,5-diamonotetrahydrofurane and N,N-Bis(3-aminopropyl)methylamine. Included in this category are also cycloaliphatic diamine such as isophorone diamine, 1,3-diaminocyclohexane, 1,4-diaminocyclohexane, bis-p-aminocyclohexylmethane, 1,3-bis(aminomethyl)cyclohexane, 1,4-bis(aminomethyl)cyclohexane, 1,3-bis(methyl)cyclohexane, 1,4-bis(methyl)cyclohexane, bis(4-amino-3-methylcyclohexyl) methane (MACM) and bis(4-aminocyclohexyl)methane (MACM).

The aliphatic diamines ($NN_{al}$) can also be selected in the group of polyetherdiamines. The polyetherdiamines can be based on an ethoxylated (EO) backbone and/or on a propoxylated (PO) backbone and they can be ethylene-oxide terminated, propylene-oxide terminated or butylene-oxide terminated diamines. Such polyetherdiamines are for example sold under the trade name Jeffamine® and Elastamine® (Hunstman).

According to an embodiment, the polyamide (P1) described herein comprises at least one aminocarboxylic acid (recurring unit ($R_{PAZ}$) according to formula (III)), and/or at least one lactam (recurring unit ($R_{PAZ}$) according to formula (III)).

The aminocarboxylic acid may have from 3 to 15 carbon atoms, for example from 4 to 13 carbon atoms. According to an embodiment, the aminocarboxylic acid is selected from the group consisting of 6-amino-hexanoic acid, 9-aminononanoic acid, 10-aminodecanoic acid, 11-aminoundecanoic acid, 12-aminododecanoic acid, 13-aminotridecanoic acid, 3-(aminomethyl)benzoic acid, 4-(aminomethyl)benzoic acid and mixture thereof.

The lactam may have from 3 to 15 carbon atoms, for example from 4 to 13 carbon atoms. According to an embodiment, the lactam is selected from the group consisting of caprolactam, laurolactam and mixture thereof.

According to a preferred embodiment, the polyamide (P1) described herein comprises at least 50 mol. % of recurring units ($R_{PA}$), for example at least 60 mol. %, at least 70 mol. %, at least 75 mol. % of recurring units ($R_{PA}$).

The polyamide described herein may comprise less than 100 mol. % of recurring units ($R_{PA}$).

According to another preferred embodiment, the polyamide (P1) described herein comprises less than 99 mol. % of recurring units ($R_{PA}$), for example less than 98 mol. %, less than 97 mol. %, less than 96 mol. % of recurring units ($R_{PA}$).

According to an embodiment, the polyamide (PA) described herein has a melting temperature (Tm) of at least about 160° C., as determined according to ASTM D3418, for example at least about 168° C., at least about 170° C.

According to an embodiment, the polyamide (PA) described herein has a melting temperature (Tm) of less about 300° C., as determined according to ASTM D3418, for example at least about 290° C., at least about 280° C.

The polyamide (P1) described herein can be prepared by any conventional method adapted to the synthesis of polyamides and polyphthalamides.

Preferentially, the polyamide (P1) described herein is prepared by reacting the monomers in presence of less than 40 wt. % of water, preferentially less than 30 wt. %, less than 20 wt. %, less than 10 wt. %, preferentially with no added water, up to a temperature of at least Tm+10° C., Tm being the melting temperature of the polyamide.

The polyamide (P1) described herein can for example be prepared by thermal polycondensation of aqueous solution of monomers and comonomers. The solution may contain a chain limiter, which is a monofunctional molecule capable of reacting with the amine or carboxylic acid moiety, and is used to control the molecular weight of the polyamide. For example, the chain limiter can be acetic acid, propionic acid, benzoic acid and/or benzylamine. A catalyst can also be used. Examples of catalyst are phosphorous acid, ortho-phosphoric acid, meta-phosphoric acid, alkali-metal hypophosphite such as sodium hypophosphite and phenylphosphinic acid. A stabilizer, such as a phosphite, may also be used.

The polyamide (P1) described herein can also advantageously be prepared by a solvent-free process, that-is-to-say a process conducted in the melt, in the absence of a solvent. When the condensation is solvent-free, the reaction can be carried out in equipment made from materials inert toward the monomers. In this case, the equipment is chosen in order to provide enough contact of the monomers, and in which the removal of volatile reaction products is feasible. Suitable equipment includes agitated reactors, extruders and kneaders.

The polyamide (P1) described herein may be present in the composition (C) in a total amount of greater than 25 wt. %, greater than 35 wt. % by weight, greater than 40 wt. % or greater than 45 wt. %, based on the total weight of the composition (C).

The polyamide (P1) may be present in the composition (C) in a total amount of less than 99.95 wt. %, less than 99 wt. %, less than 95 wt. %, less than 90 wt. %, less than 80 wt. %, less than 70 wt. % or less than 60 wt. %, based on the total weight of the composition (C).

The polyamide (P1) may for example be present in the composition (C) in an amount ranging between 25 and 60 wt. % for example between 40 and 55 wt. %, based on the total weight of the polyamide composition (C).

The polyamide molding composition (C) of the invention also comprises at least one polymer (P2), which is such that:

$$Tm(P2) \geq Tm(P1),$$

with Tm(P2) and Tm(P1) being respectively the melting point of P2 and P1, $$Tc(P2) > Tc(P1),$$

with Tc(P2) and Tc(P1) being respectively the crystallization temperature of P2 and P1 upon cooling from the melt, and $$Tm(P2) - Tc(P2) < Tm(P1) - Tc(P1).$$

In some embodiments, P2 is a polyamide distinct from polyamide (P1).

In some embodiments, P2 is a polyamide having a melting temperature ($Tm_{P2}$) of at least 235° C., as determined according to ASTM D3418, for example at least about 240° C., at least about 245° C.

In some embodiments, P2 is a polyamide selected from the group consisting of polyamide 66, polyamide 68, polyamide 610, polyamide 106 (polydecamethylene adipamide), polyphthalamide (PPA), polyamide MP6 (copolymer of m-xylylenediamine and para-xylylenediamine with adipic acid), and polyamide MP10 (copolymer of m-xylylenediamine and para-xylylenediamine with sebacic acid).

In the context of the present invention, a polyamide 66 comprises at least 90 mol. %, preferably at least 95 mol. %, recurring units complying with the formula of —NH—(CH$_2$)$_6$—NH—CO—(CH$_2$)$_4$—CO—, which can be notably obtained via polycondensation reaction of hexamethylene diamine and adipic acid.

In some embodiments, P2 is a polyamide comprising recurring units ($R_{PA2}$) according to formula (V):

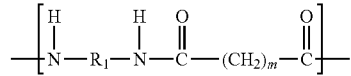

wherein
m varies between 6 and 18, inclusive, preferably m equals 6, 8 or 10, and R$_1$ is p-xylene (PX). In some embodiments, m equals 8 or 10.

According to this embodiment, P2 may comprise at least 50 mol. % of recurring units ($R_{PA2}$) according to formula (V), based on the total number of moles in the polyamide (P1), for example at least 60 mol. %, at least 70 mol. %, at least 80 mol. %, at least 90 mol. %, at least 95 mol. %, at least 99 mol. %.

According to this embodiment, P2 may be the condensation product of a mixture comprising:
at least one diamine component which is the p-xylylene diamine, and at least one diacid component which is dicarboxylic acid HOOC—(CH$_2$)$_m$—COOH, wherein m varies between 6 and 18 inclusive, or derivatives thereof.

According to this embodiment, P2 may be the condensation product of a mixture comprising:
- at least one diamine component which is the p-xylylene diamine, and
- at least one diacid component which is sebacic acid.

According to this embodiment yet, P2 may derive from a condensation mixture further comprising at least one additional component selected from the group consisting of:
- at least one dicarboxylic acid component or derivative thereof, and at least one diamine component, as described above in reference to P1,
- at least one aminocarboxylic acid, as described above in reference to P1, and/or
- at least one lactam, as described above in reference to P1.

In the composition (C) of the present invention, the weight ratio of P1/P2 varies between 15/1 and 1/1, inclusive, for example between 14/1 and 3/2, inclusive, or for example between 10/1 and 2/1, inclusive.

The polyamide molding composition (C) may also comprise one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

A large selection of reinforcing agents, also called reinforcing fibers or fillers, may be added to the composition according to the present invention. They can be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 1, at least 2, at least 5, at least 20 or at least 50. They can also be selected from flat fibers, i.e. non circular cross section, e.g. star-shaped fibers and triangular-shaped fibers.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of from 10 wt. % to 60 wt. %. In some embodiments, they are present in an amount greater than 15 wt. %, greater than 20 wt. % by weight, greater than 25 wt. % or greater than 30 wt. %, based on the total weight of the composition (C). The reinforcing agents may be present in the composition (C) in a total amount of less than 60 wt. %, less than 55 wt. % or less than 50 wt. %, based on the total weight of the composition (C). The reinforcing filler may for example be present in the composition (C) in an amount ranging between 20 and 60 wt. %, for example between 30 and 50 wt. %, based on the total weight of the polyamide molding composition (C).

Preferably, the reinforcing agents are glass fibers, carbon fibers, or mixtures thereof.

In some embodiments, the composition (C) comprises from 0.5 wt. % to 5 wt. % of pigment, dye or colorant selected from the group consisting of TiO$_2$, carbon black, zinc sulfide, barium sulfate, zinc oxide, ferric oxide and any combination of one or more thereof, based on the total weight of the composition.

In some embodiments, the composition (C) comprises from 20 wt. % to 70 wt. % of the polyamide (P1), based on the total weight of the composition. For example, the composition (C) may comprises from 25 wt. % to 60 wt. % of the polyamide (P1), or from 29 wt. % to 50 wt. % of the polyamide (P1).

The composition (C) of the present invention may also comprise a toughener. A toughener is generally a low glass transition temperature ($T_g$) polymer, with a $T_g$ for example below room temperature, below 0° C. or even below −25° C. As a result of its low $T_g$, the toughener are typically elastomeric at room temperature. Tougheners can be functionalized polymer backbones. The toughener may be present in the composition (C) in a total amount of greater than 1 wt. %, greater than 2 wt. % or greater than 3 wt. %, based on the total weight of the composition (C). The toughener may be present in the composition (C) in a total amount of less than 30 wt. %, less than 20 wt. %, less than 15 wt. % or less than 10 wt. %, based on the total weight of the composition (C).

The composition (C) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers in addition to polymer P2. Preferably, the one or more other polymers comprise polyamides different from the polyamide (P1) of the present invention. Mention can be made notably of semi-crystalline or amorphous polyamides, such as aliphatic polyamides, semi-aromatic polyamides, and more generally the polyamides obtained by polycondensation between an aromatic or aliphatic saturated diacid and an aliphatic saturated or aromatic primary diamine, a lactam, an amino-acid or a mixture of these different monomers.

Preparation of the Polyamide Composition (C)

Also described herein is a method of making the composition (C) as above detailed, said method comprising melt-blending the polyamide (P1), the polymer (P2) and the specific components, e.g. a filler, a toughener, a stabilizer, and of any other optional additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

The present invention relates to articles comprising the polyamide molding composition (C) described herein. These articles can be used for automotive, transportation, electrical and electronics, household utensils, and consumer goods. Typical applications include control system enclosures, housings for water pumps, thermostats and electronic valve pumps, oil coolers, water pump impellers, heater core end caps, snap-fit electrical terminals and molded-in-place gaskets, connectors and switches, medical device housings, consumer products (e.g. appliances, coffee machines, vacuum cleaners), furniture, sporting goods (e.g. bicycle parts, archery, fishing components).

The molded article prepared from the composition (C) of the present invention has a calculated percentage of crystallinity higher than 90%, preferably higher than 95%, as measured according to the following equation:

$$\% \text{ of crystallinity} = \frac{\Delta Hf - \Delta Hc}{\Delta Hf} \times 100$$

wherein:
ΔHf is the enthalpy of fusion at 1st heating (J/g),
ΔHc is the crystallization enthalpy at 1st heating (J/g),
as measured by DSC according to ASTM D3418 (TA Instruments D2920 with nitrogen as carrier gas of high purity, 50 ml/min).

Advantageously, the article of the present invention not only present a calculated percentage of crystallinity higher than 90%, as explained above, but also presents at least one of the following properties:
an impact strength of at least 40 kJ/m², as measured according to ISO 180/1U, at least 42 kJ/m²,
a modulus of at least 18 GPa, as measured according to ISO0527, preferably 19 GPa,
a gloss of at least 1.5 at 20°, at least 8 at 60° and at least 12 at 85° as measured according to ISO02813, when molded at 90° C.,
a gloss of at least 3 at 20°, at least 15 at 60° and at least 20 at 85° as measured according to ISO02813, when molded at 100° C.,
a surface rugosity of less than 1.5 μm as measured according to ISO 4287:1997, when molded at 90° C.,
a surface rugosity of less than 1 μm as measured according to ISO 4287:1997, when molded at 100° C.

Should the disclosure of any patents, patent applications, and publications which are incorporated herein by reference conflict with the description of the present application to the extent that it may render a term unclear, the present description shall take precedence.

Examples

These examples demonstrate that the compositions of the invention have an increased nucleation speed, and can be molded at a temperature lower than 110° C., for example at 100° C. or 90° C.

Polyamides

PA #1 (inventive): Lexter® 6700, polyamide MXD6/PXD6 50/50 from Mitsubishi Gas Chemical Company, Inc. CAS n° 25718-71-2—mixture of 50/50 p-xylylene diamine and m-xylylene diamine+adipic acid (Tm=277° C.; Tc=230° C.).

PA #2 (comparative): The comparative polyamide #2 was prepared according to the following process: adipic acid (394 g, from Invista), sodium acetate (0.4 g, from Sigma Aldrich) and sodium hypophosphite (0.7 g, from Sigma Aldrich) were charged into a 6L reactor. After purging with nitrogen, the reactor was heated to 171° C. m-xylylene diamine (368 g, from Mitsubishi Gas Chemical Company) was added dropwise into the reactor. After the m-xylylene diamine addition, the reacting mixture was heated to 246° C. and any water generated was released as steam. The mixture was kept at this temperature for another 40 minutes. The polymer melt was then discharged and pelletized (Tm=236° C.; Tc=205° C.).

Other Components

Polymer P2: Lexter® 8900, polyamide PXD10 from Mitsubishi Gas Chemical Company, Inc. (Tm=282° C.; Tc=249° C.).
E Glass fibers, ChopVantage® 3540 HP (EC 10 3,8 mm)
PA66: Radipol® A45

Polyamide Molding Compositions

Different compositions were prepared, as detailed in Table 1.

Each formulation was melt compounded using a 30 mm diameter Coperion® ZSK-30 co-rotating partially intermeshing twin screw extruder having an L/D ratio of 35:1. The barrel sections 2 through 11 and the die were heated to 290° C.

The melt temperature reached about 300° C.

In each case, the resin blends were fed at barrel section 1 using a gravimetric feeder at throughput rates in the range 30-35 lb/hr. The extruder was operated at screw speeds of around 300 RPM. Vacuum was applied at barrel zone 10/11 with a vacuum level of about 27 inches of mercury or less than 0.1 atm. A double-hole die was used for all the compounds to give a filament approximately 2.6 to 2.7 mm in diameter and the polymer filament exiting the die was cooled in water and fed to the pelletizer to generate pellets approximately 2.7 mm in length. Pellets were dried at 140° C. for several h prior injection molding (IM, comparative examples) to reach a moisture content less than 0.15% measured with a thermobalance device.

Injection molding was used to produce tensile ISO0527-2 type 1A bars and ISO0178 flex bars in a mold regulated at 120° C.

Test Methods

Crystallization enthalpies (ΔHc) at 1st heating (J/g) and enthalpies of fusion (ΔHf) at first heating (J/g) were measured on 2 mm-thick parts at two distinct mold temperatures (90° C. and 100° C.), by DSC measurements according to ASTM D3418 on TA Instruments DSC 2920 with nitrogen as carrier gas (high purity, 50 ml/min).

DSC test conditions: heating and cooling rates of 20K/min.
1st heating: start at −20° C. up to Tm+50° C.
Isotherm: 1 to 10 minutes at final temperature 1$^{st}$ heating
Cooling: start at isotherm and cool up to −20° C.
2nd heating: −20° C. up to Tm+50° C.

The following parameters were applied to CEx1:
-20° C. to 280° C. @ 20K/min
isotherm 280° C. 10 min
280° C. to -20° C. @ -20K/min
-20° C. to 290° C. @ 20K/min
The following parameters were applied to CEx2, Ex3, Ex4, Ex5 and CEx6:
-20° C. to 330° C. @ 20K/min
isotherm 330° C. 10 min
330° C. to -20° C. @ -20K/min
-20° C. to 330° C. @ 20K/min The calculated percentage of crystallinity is measured according to the following equation:

$$\% \text{ of crystallinity} = \frac{\Delta Hf - \Delta Hc}{\Delta Hf} \times 100$$

Tensile properties (ISO0527) and impact strength izod (ISO 180/1U) are reported in Table 1.

TABLE 1

|  |  | CEx1 | CEx2 | Ex3 | Ex4 | Ex5 | CEx6 |
| --- | --- | --- | --- | --- | --- | --- | --- |
| PA#1 (inv) |  | — | 49 | 44 | 39 | 29 | — |
| PA#2 (comp) |  | 44 | — | — | — | — | — |
| PA66 |  | 5 | — | — | — | — | — |
| E-glass fibers |  | 50 | 50 | 50 | 50 | 50 | 50 |
| P2-PXD10 |  | — | 0 | 5 | 10 | 20 | 49 |
| Talc |  | 1 | 1 | 1 | 1 | 1 | 1 |
| Wt. % P1/P2 |  | — | — | 8.8 | 3.9 | 1.45 | — |
| Tm (° C.) |  | 237 | 278 | 279 | 277 | 277 | 283 |
| Tc (° C.) |  | 205 | 229 | 224 | 215 | 195 | 250 |
| Crystallization enthalpy (J/g) | Mold temp. 90° C. | 14.6 | 5.7 | 3.2 | 0 | 0 | 0 |
| Enthalpy of fusion (J/g) |  | 23.6 | 24.0 | 24.7 | 24.4 | 18.3 | 28.7 |
| Calculated % of crystallinity |  | 38 | 76 | 87 | 100 | 100 | 100 |
| Crystallization enthalpy (J/g) | Mold temp. 100° C. | 13.7 | 4.0 | 3.2 | 0 | 0 | 0 |
| Enthalpy of fusion (J/g) |  | 24 | 25 | 24 | 23 | 23 | 24 |
| Calculated % of crystallinity |  | 43 | 84 | 87 | 100 | 100 | 100 |
| Tensile stress at break (MPa) |  | 282.2 | 276.3 | 284.5 | 277.8 | 280.3 | 226.5 |
| Strain at Break (%) |  | 1.92 | 1.68 | 1.80 | 1.77 | 1.90 | 1.94 |
| Modulus (GPa) |  | 20.29 | 20.66 | 20.32 | 19.99 | 19.54 | 17.13 |
| IZOD NE (kJ/m²) |  | 61.95 | 49.86 | 44.32 | 52.46 | 56.62 | 57.87 |

TABLE 2

|  |  | CEx2 | Ex3 | Ex5 |
| --- | --- | --- | --- | --- |
| Rugosity | Mold temperature 100° C. | 1.17 | 0.83 | 0.46 |
| Gloss 20° |  | 2.43 | 3.93 | 15.40 |
| 60° |  | 11.90 | 21.77 | 46.17 |
| 85° |  | 18.30 | 35.77 | 73.90 |
| Rugosity | Mold temperature 90° C. | 1.62 | 1.35 | 0.97 |
| Gloss 20° |  | 1.43 | 1.83 | 2.83 |
| 60° |  | 6.60 | 8.87 | 12.90 |
| 85° |  | 10.93 | 13.93 | 34.53 |

The compositions of the present invention produce molded articles having surface characteristics, i.e. rugosity and gloss, similar to articles molded with conventional high temperature high pressure techniques.

The Applicant demonstrates that the compositions of the present invention can be molded at low temperatures (e.g. 90° C. and 100° C.) as the crystallisation enthalpies at 1st heating of the compositions of the present invention are significantly lower than the ones of the comparative compositions, while still maintaining tensile and impact resistance properties. The composition of CEx6 shows low crystallisation enthalpies at 1st heating under both assessed mold temperatures, but the tensile stress at break is significantly reduced.

Aesthetic Evaluation

Rugosity (ISO 4287:1997) and gloss (ISO2813) of certain examples were measured and are reported in Table 2 below.

The invention claimed is:

1. A polyamide molding composition, comprising the following melt-blended components:
at least one polyamide (P1) consisting essentially of recurring units ($R_{PA}$) according to formula (I):

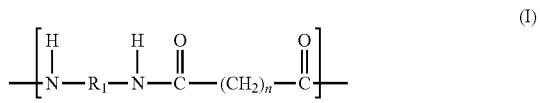

wherein n is 4, and
$R_1$ is a mixture of m-xylylene and p-xylylene in a mol. % ratio varying between 1:99 and 99:1, at least one polymer (P2) such that:

$$Tm(P2) \geq Tm(P1),$$

with Tm(P2) and Tm(P1) being respectively the melting point of P2 and P1, $$Tc(P2) > Tc(P1),$$

with Tc(P2) and Tc(P1) being respectively the crystallization temperature of P2 and P1 upon cooling from the melt, and $$Tm(P2)-Tc(P2) < Tm(P1)-Tc(P1)$$

optionally at least one reinforcing agent,
optionally at least one component selected from the group consisting of tougheners, plasticizers, colorants, pigments, antistatic agents, dyes, lubricants, thermal stabilizers, light stabilizers, flame retardants, nucleating agents and antioxidants;
wherein
the weight ratio of P1/P2 varies between 15/1 and 1/1, inclusive and
polymer (P2) comprises recurring units ($R_{PA2}$) according to formula (V):

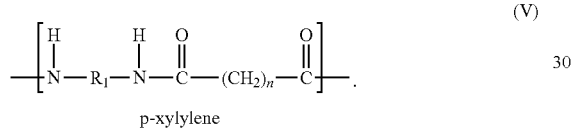

p-xylylene wherein m varies between 6 and 18, inclusive and $R_1$ is p-xylylene.

2. The composition of claim 1, comprising at least 50 mol. % of recurring units ($R_{PA}$) according to formula (I), based on the total number of moles in the polyamide (P1).

3. The composition of claim 1, wherein the polyamide (P1) is the condensation product of a mixture comprising:
at least one diamine component which is blend of m-xylylene diamine and p-xylylene diamine, and
at least one dicarboxylic acid HOOC—$(CH_2)_n$—COOH, wherein n is 4.

4. The composition of claim 1, comprising from 10 wt. % to 60 wt. % of the at least one fiber reinforcement selected from the group consisting of glass fibers, carbon fibers, or mixtures thereof, based on the total weight of the composition.

5. The composition of claim 1, comprising from 0.5 wt. % to 5 wt. % of pigment, dye or colorant selected from the group consisting of $TiO_2$, carbon black, zinc sulfide, barium sulfate, zinc oxide, ferric oxide and any combination of one or more thereof, based on the total weight of the composition.

6. The composition of claim 1, comprising from 20 wt. % to 70 wt. % of the polyamide (P1), based on the total weight of the composition.

7. The polyamide molding composition of claim 1, wherein polymer (P2) is the condensation product of a mixture comprising at least one diamine component which is the p-xylylene diamine, and at least one diacid component which is a dicarboxylic acid HOOC—$(CH_2)_m$—COOH wherein m varies between 6 and 18 inclusive or derivatives thereof.

8. The polyamide molding composition of claim 1, wherein polymer (P2) is the condensation product of a mixture comprising at least one diamine component which is the p-xylylene diamine, and at least one diacid component which is sebacic acid.

9. A process to manufacture an article using molding, comprising the steps of: heating a melt-blended polyamide molding composition comprising:
at least one polyamide (P1) comprising recurring units ($R_{PA}$) according to formula (I):

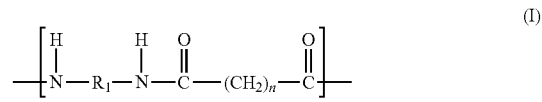

n varies is 4; and
$R_1$ is a mixture of m-xylylene and p-xylylene;
at least one polymer (P2) comprising recurring units ($R_{PA2}$) according to formula

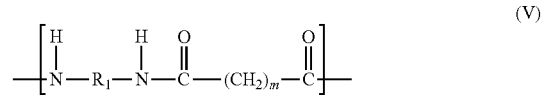

m varies between 6 and 18, inclusive and $R_1$ is p-xylylene

Tm(P2)≥Tm(P1), with Tm(P2) and Tm(P1) being respectively the melting point of P2 and P1;

Tc(P2)≥Tc(P1), with Tc(P2) and Tc(P1) being respectively the crystallization temperature of P2 and P1 upon cooling from the melt;

$$Tm(P2)-Tc(P2) < Tm(P1)-Tc(P1); \text{ and}$$

the weight ratio of P1/P2 varies between 15/1 and 1/1;
optionally at least one reinforcing agent,
optionally at least one component selected from the group consisting of tougheners, plasticizers, colorants, pigments, antistatic agents, dyes, lubricants, thermal stabilizers, light stabilizers, flame retardants, nucleating agents and antioxidants;
heating a mold to a temperature of less than 110° C.; injecting the melted composition into the heated mold; and releasing the molded article, wherein the molded article has a calculated percentage of crystallinity higher than 90%, as calculated according to the following equation:

$$\% \text{ of crystallinity} = \frac{\Delta Hf - \Delta Hc}{\Delta Hf} \times 100$$

wherein $\Delta Hf$ is the enthalpy of fusion at $1^{st}$ heating (J/g), $\Delta Hc$ is the crystallization enthalpy at $1^{st}$ heating (J/g), and both $\Delta Hf$ and $\Delta Hc$ are measured by DSC according to ASTM D3418.

10. The process of claim 9, wherein water is used to heat the mold.

11. A molded article comprising a melt-blended polyamide molding composition, the polyamide molding composition comprising:
  at least one polyamide (P1) comprising recurring units ($R_{PA}$) according to formula (I):

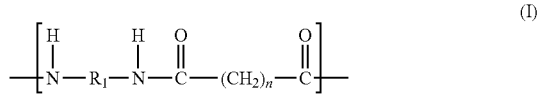

n is 4; and
  $R_1$ is a mixture of m-xylylene and p-xylylene in a mol. % ratio varying between 1:99 and 99:1;
  at least one polymer (P2) comprising recurring units ($R_{PA2}$) according to formula (V):

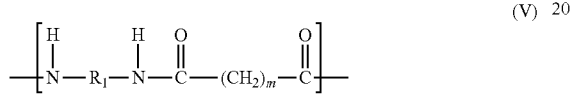

where
  m varies between 6 and 18, inclusive and $R_1$ is p-xylylene
  Tm(P2)≥Tm(P1), with Tm(P2) and Tm(P1) being respectively the melting point of P2 and P1;
  Tc(P2)>Tc(P1), with Tc(P2) and Tc(P1) being respectively the crystallization temperature of P2 and P1 upon cooling from the melt;

$Tm(P2)-Tc(P2)<Tm(P1)-Tc(P1)$; and the weight ratio of P1/P2 varies between 15/1 and 1/1;
  optionally at least one reinforcing agent; and
  optionally at least one component selected from the group consisting of tougheners, plasticizers, colorants, pigments, antistatic agents, dyes, lubricants, thermal stabilizers, light t stabilizers, flame retardants, nucleating agents and antioxidants;
  wherein the molded article has a calculated percentage of crystallinity higher than 90%, as calculated according to the following equation:

% of crystallinity=$\Delta Hf-\Delta Hc/\Delta Hf\times 100$ wherein ΔHf is the enthalpy of fusion at 1st heating (J/g), ΔHc is the crystallization enthalpy at 1st heating (J/g), and both ΔHf and ΔHc are measured by DSC according to ASTM D3418.

12. The article of claim 11, comprising at least one of the following properties:
  an impact strength of at least 40 KJ/m$^2$, as measured according to ISO 180/1U;
  a modulus of at least 18 GPa, as measured according to ISO527;
  a gloss of at least 1.5 at 20° as measured according to ISO2813, when molded at 90° C.;
  a gloss of at least 3 at 20°, at least 15 at 60° and at least 20 at 85° as measured according to ISO2813, when molded at 100° C.;
  a surface rugosity of less than 1.5 μm as measured according to ISO 4287:1997, when molded at 90° C.; or
  a surface rugosity of less than 1 μm as measured according to ISO 4287:1997, when molded at 100° C.

* * * * *